3,306,806
**TAPE DISPENSER WITH COORDINATED DISPENS-
ING, SEALING AND CUTTING MECHANISM**
Edward S. Seropian, 1471–F Timberlake Road,
St. Paul, Minn. 55117
Filed July 20, 1964, Ser. No. 383,831
12 Claims. (Cl. 156—523)

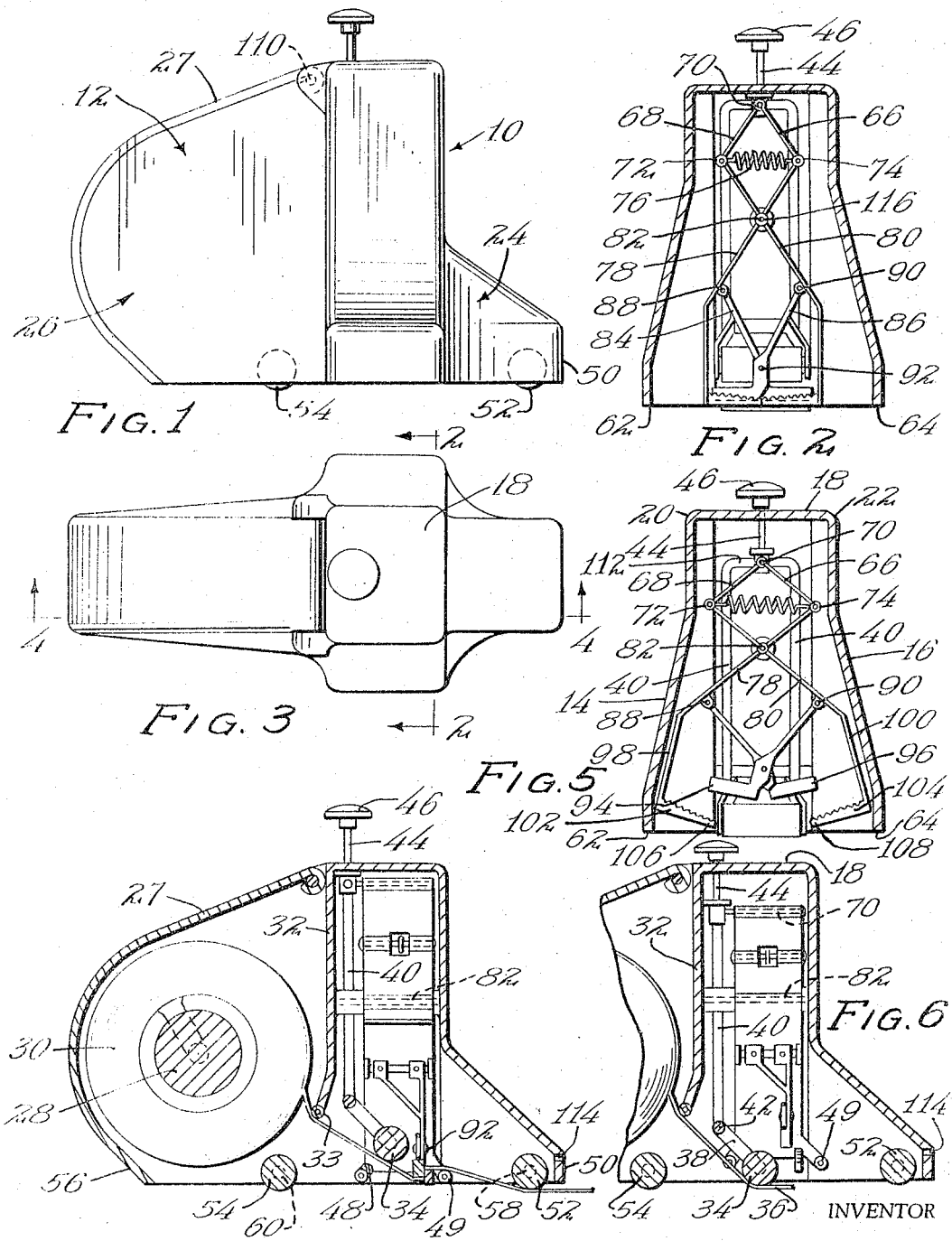

This invention relates to a tape sealer adapted to be used in surface mounted or hand held relation to an object to be sealed by tape dispensed from a roll within the sealer, the sealer having means to urge the tape into sealing relation with the object, means to guide the tape into dispensing relation, and means to shear the tape being dispensed at any point desired.

In connection with various dispensers which have previously been provided, in most dispensers which are designed to be held in the hand, it is necessary to remove a certain portion of the tape or ribbon being dispensed from the dispenser to shear off this piece of tape or ribbon, and then to apply it to the object being sealed or ribboned. Various attempts have been made to provide shearing means in relation to the sealer but except in the instances where considerable amount of machinery has been provided these have been too complicated, too expensive, or otherwise subject to various defects so as to limit their popular usage. Additionally, it has not been possible to use a sealer or dispenser either with ribbons or adhesive tapes alternatively as desired.

It is an object of the present invention to provide a dispenser adapted to hold a roll of adhesively faced tape or a roll of ribbon and to dispense the tape or ribbon in any quantity desired.

It is a further object of the present invention to provide a tape or ribbon dispensing body in which the tape or ribbon may be dispensed either from the bottom of the dispenser or from an aperture in generally parallel relation to the bottom of the dispenser.

It is a further object of the present invention to provide a tape or ribbon dispenser having a body, a spindle within the body on which a roll of ribbon or tape is rotatively secured, means within the body to guide the tape or ribbon to a point of dispensing, and roller means whereby the tape may not only be dispensed more readily but may be sealed through pressure of the roller on the tape being dispensed.

It is a further object of the present invention to provide a dispenser sealer in which the tape being dispensed in sealing relation to an object is urged by rollers against the object being taped, and having a cutter within the body coordinated with the tape from the body so that the tape being dispensed may be secured at any desired point.

It will be understood that as tape is dispensed from the ordinary dispenser, the adhesive tape engages against the object being sealed. In order to dispense only the needed amount of tape, it is generally necessary to pull out a portion longer than is needed and to cut the tape at the desired point and then reroll the unused tape back on to the roll. My invention provides means whereby the operator sealing a particular object with tape dispensed from the sealer need only dispense the amount of tape desired.

In general I provide a tape sealer having a body which is hollow, the body having upstanding spaced apart parallel sides, and a spindle within the body upon which a roll of tape is adapted to be placed. The tape is lead from the spindle roll to an outlet adjacent the forward end of the body. Alternatively, the tape may be dispensed either through the bottom or the front end of the body through convenient outlets provided. A roller is provided adjacent to the front end outlets, the roller extending somewhat beneath the bottom of the body so that tape dispensed beneath the roller through the bottom of the outlet is urged into sealing contact with the object being taped by the roller. In the event that tape is dispensed through the outlet in the front end of the body, the tape passes over the roller in being dispensed. The alternative provision is obviously of advantage in particular types of ribbon tying. The spindle upon which the roll is supported is spaced some distance rearwardly from the front end of the dispenser sealer. A guide arm is provided whereby tape dispensed from the roll is rollably guided toward the bottom of the dispenser, a pressure member in the form of a roller adjacent to the guide member urging the tape downwardly into a position relatively parallel to the bottom of the dispenser. In other words, the tape passes from the roll guided by an arm preferably having an end roller, beneath the pressure roller which places it in a desired parallel relation to the bottom and outwardly from the dispensing outlet and beneath the sealing roller previously described. Where one of the so-called pressure sensitive tapes are being dispensed, it will be understood that one surface of the tape is adhesively coated whereas the other surface of the tape is not. Accordingly, the non-adhesive surface of the tape passes against the pressure roller so no adhesion will occur. Intermediate the pressure roller and the forward roller finger means are provided within the body extending perpendicular to the sides of the tape, the finger means being adapted to move into and out of underlying relation to the tape being dispensed so as to raise the tape upwardly in the body where shear member may cut the tape at any point desired. Actuating means are provided so that the movement of the fingers to raise the tape and the shear means to cut the tape operate in a particular manner.

It is obvious that my dispenser provides a unique advantage which has not been previously available. The dispenser may be made in a transparent plastic, or any other suitable material which will provide sufficient strength or body to support the tape and the operating elements within the body. An additional advantage occurs in the event of using at least one side of the body being transparent in that the user is always aware of the amount of tape left on the spindle roll.

It is an object of the present invention to provide a dispenser-sealer having shear means which may be actuated by a plunger mechanism at any desired point of shearing. It is a further object of the present invention to provide roller means for a dispenser whereby the dispenser-sealer may be moved over a surface to be taped on to the rollers serving both to make movement of the sealer easier and to urge the tape being dispensed into sealing relationship with the object being taped. It is a further object of the present invention to provide means within a dispensing-sealer body whereby tape being dispensed may be raised from the surface to which the tape is to be adhered so that shearing of the tape occurs away from the surface being sealed.

It is a further object of the present invention to provide a device which may be made in a size adapted to be held in the hand, or which may be adapted to be larger mechanical installations if desired. It is a further object of the present invention to provide a dispenser-sealer in which the tape or ribbon being dispensed may be dispensed from a choice of convenient outlets depending upon the material being dispensed and the usage for the material.

It is a further advantage of the present invention to provide a dispenser-sealer which is relatively inexpensive to manufacture, easy to operate, effective in its operation, and relatively free from problems of maintenance.

These and other objects and novel features of the invention will be more particularly described in detail in the accompanying specification taken in conjunction with the drawings herein which:

FIGURE 1 is a side elevation of the dispenser-sealer.

FIGURE 2 is an elevational view partly in section of the interior of the dispenser-sealer in which the relationship of the shearing means to the other parts of the operating mechanism may be seen. The section is taken along the lines 2—2 of FIGURE 3.

FIGURE 3 is a top plan view of the dispenser-sealer.

FIGURE 4 is a section taken along the lines 4—4 of FIGURE 3 in which the relation of the roll of tape on the spindle in relation to the guide, pressure rollers, shear mechanism and dispensing outlets is clearly shown.

FIGURE 5 is a view in elevation of the interior mechanism of the dispenser-sealer illustrating the relationship of the shear mechanism and finger means when tape is being dispensed.

FIGURE 6 is a view in elevtation of the forward portion of the dispenser showing the interrelationship of the part as tape is being dispensed.

I provide a dispenser-sealer for the dispensing of tape, ribbon and the like generally numbered 10 having an outer body of plastic, metal, or other suitable material to form a hollow shell. The hollow outer body shell is generally numbered 12. As may be clearly seen in the views of the FIGURES 2 and 5, the shell 12 comprises a pair of generally upstanding sides 14 and 16, the lower portions of the sides 14 and 16 in the preferred construction sloping outwardly to provide a greater space within the body for movement of mechanism designed to raise tape being dispensed into shearing relation as will be further described. A top member 18 is secured to the sides 14 and 16 along top edges 20 and 22. In the preferred construction the bottom of the shell is not enclosed in order to reduce cost and to enable the interior of the body to be more accessible, but obviously, as will be apparent a bottom could be provided if desired.

The sides 14 and 16 are sufficiently spaced apart from each other so as to provide room not only for a roll or tape or ribbon to be contained within the dispenser, but in addition to provide sufficient room for the rolls of ribbon or tape to be easily dispensed, raised from the surface to which they are being dispensed, and sheared as will be further described. The shell 12 may be transparent in order that the amount of tape or ribbon left on a roll can be clearly seen.

The body 12 includes a forward area generally numbered 24 in which the guiding, dispensing, and shearing mechanism is contained, and a rearward section generally numbered 26 in which a roll of tape or ribbon and the like is contained for dispensing purposes. A spindle 28 is provided in the rear area 26 upon which a roll of tape or ribbon is placed, the roll being numbered 30. The spindle 28 extends between the sides 14 and 16 in a plane generally parallel to the bottom of the dispenser. The tape 30 is placed on the spindle 28 in a manner which is commonly known, the roll of tape or ribbon 30 turning on the spindle 28 as the tape or ribbon is dispensed.

The tape to be dispensed is led from the roll 30 toward the forward portion 24, the tape being urged downwardly toward the bottom of the dispenser as it comes from the roll by a guide 32 preferably having a roller 33 at its bottom end, the guide extending downwardly between the sides 14 and 16 from the top member 18 as may be clearly seen in FIGURE 4. The leading end of the tape dispensed is lead beneath a pressured roller 34 which urges the tape end 36 into engagement with the surface being taped. The pressure roller 34 is in overlying relation to the non-adhesive surface of the tape being dispensed. The roller 34 is suspended from an arm 38 which extends downwardly and forwardly from an end of a shaft 40, the arm 38 being angularly secured to the end of the shaft 40 as indicated at 42 before it is actuated to move upwardly or downwardly by a plunger arm 44 which moves up and down with the shaft 40.

The plunger arm 44 extends through the top of the dispenser and has an enlarged head portion 46 to enable the arm 44 to be more easily moved upwardly or downwardly with the shaft 40. To enable ease of feeding the tape into position for dispensing tape on roll spindle 28, the roll of tape is inserted with the lead end free of the roll and projecting out of the bottom ahead of the roller 54. The hinged cover 27 is closed and the plunger head 46 is depressed thereby removing all parts from the path of travel except the depressed roller 34. The tape is next pulled out by use of the fingers, beyond the forward end wall 50. This procedure would be used only for starting a new roll because after this the dispenser holds the tape in readiness to be used by contact with knurled rollers 48.

As may be seen in FIGURE 4 tape coming from the roll is lead between the pressure roller 34 and opposed lifting rollers, one of which is shown and numbered 48 which move in relation to the pressure roller 34 in a manner to be described.

As will be understood where a pressure sensitive tape is being dispensed, the upper surface of the tape is non-adhesive and passes beneath the pressure roller 34 and between the opposed rollers 48 having a knurled circumference and the roller 34 is being dispensed, the roller 34 urging the end of the tape 36 as it is dispensed against the surface being sealed. As the dispenser 10 is moved rearwardly along a surface being sealed, the end of the tape 36 will gradually extend beneath the front end 50 of the dispenser 10 to enable the dispenser 10 to move more readily along a surface being sealed. A forward roller 52 is provided adjacent the front end 50, and a rearward roller 54 is provided in proximity to the rear end 56 of the dispenser 10. The rollers 52 and 54 are mounted on shafts 58 and 60 which extend transversely between the sides 14 and 16, a portion of the rollers 52 and 54 extending beneath the bottom edges 62 and 64 of the sides 14 and 16 to support the bottom edges slightly above the surface being sealed and to enable the dispenser to be moved more readily along the surface being sealed. The pressure roller 34, it will be understood urges the tape being dispensed into sealing relation with the surface being sealed and the forward roller 52 similarly presses along the upper surface of dispensed tape to more tightly adhere it to the surface being sealed. The rear roller 54 enables the dispenser to remain in parallel relation to the surface being sealed.

The plunger arm 44 is secured to lever arms 66 and 68 at their upper end extremities by a pivot as indicated at 70 in FIGURE 2. The lever arm segments 66 and 68 extend diagonally from the pivot 70. A pair of lever segments 78 and 80 extend from the ends 72 and 74 of the segments 68 and 66, the segments 78 and 80 being pivotally secured in crossed relation by a pivot pin 82. Shear arm support members 84 and 86 are pivotally secured to the lower ends of the segments 78 and 80 as indicated at 88 and 90. The shear arm supports are secured in crossed pivotal relation by a pin 92. From the crossed shear support 84 and 86 cutting means in the form of blade members 94 and 96 extend outwardly towards the sides 15 and 16 of the dispenser tin.

In the preferred construction the blades 94 and 96 are slightly arcuate so as to enable the blades to perform the slicing operation inwardly from the side edges of the tape being dispensed when it is desired to shear the tape.

It will be understood that the spring 76 tends to urge the ends 72 and 74 of the lever segments 68 and 66 together which serve to urge the head 46 of the plunger arm 44 outwardly from the top 18 of the dispenser 10.

From the lever segments 78 and 80, a pair of support arms 98 and 100 extend downwardly toward the bottom of the dispenser, the arms 98 and 100 having at their lowermost extremity upwardly faced serrated fingers 102 and 104 which extend inwardly toward each other and which extend slightly downwardly from the extreme ends of the arms 98 and 100.

The fingers 102 and 104 are designed with the serrated edge to more readily frictionally engage adhesive surface of the tape in order to raise it to a shearing relationship with the blades 94 and 96. The fingers 102 and 104 are tapered as may be clearly seen in FIGURE 5 being of greatest thickness at the points where they are secured to the arms 98 and 100 and of least thickness at their ends 106 and 108.

Opposed knurled rollers 49 are provided forwardly of and in coordination with the fingers 102 and 104 to enable the cut end of the tape to be supported above the surface being sealed so as to be dispensed smoothly upon the surface being sealed.

As may be clearly seen by comparison of FIGURE 4 with FIGURES 2 and 5, the pivot 82 is a fixed pivot point in relation to the guide 32 with which it is integrally secured. In other words, the crossed arm segments pivot about the fixed point 82 and secondarily at the other pivot points previously indicated.

In the preferred construction, the plunger arm 44 extends through an aperture in the roof 18 having a head 46 on its outer end and having its inner end junctioned with the upper ends of the arms 66 and 68 as indicated at 70. It will be understood that downward pressure upon the plunger head 46 urges the arm 44 downwardly within the body 12 and similarly urges the pressure roller 34 downwardly into pressured relation to the tape being dispensed. At the same time the downward urging of the arm 44 induces because of the crossed relationship of the lever arm segments, a movement of the fingers 102 and 104 away from engagement with the tape and similarly raises the blades 94 and 96 away from shearing relation with the tape.

When the plunger 46 is released, the spring 76 urges the lever arm segment connected at pivots 72 and 74 inwardly away from the sides 14 and 16 of the dispenser. This inward movement of the arm segment causes the roller 48 to move beneath the tape as the fingers 102 and 104 move inwardly toward underlying relation with the tape. In other words, the roller means 48 serves to lift the tape to enable the ends 106 and 108 of the fingers 102 and 104 to more easily move into underlying relation with the tape. As the fingers 102 and 104 raise the tape upwardly, the shear blades 94 and 96 move downwardly and towards each other to shear the tape being held on the serrated edges of the fingers 102 and 104.

After being cut the roll end of the tape is held within the body of the dispenser by the rollers such as 48. The end edge of the tape being dispensed in sealing relation to a surface is sealed to the surface by the backward movement of the roller 52 over the dispensed tape as would be obvious.

As is clearly illustrated in FIGURES 1 and 4 the rear portion of the body 26 has a cover 27 pivoted along its upper end as indicated at 110 to the forward portion of the body to enable the rolls of tape to be placed on the spindle 28. It is obvious that any convenient form of hinging would be satisfactory in order to enable a roll of tape or ribbon to be placed on the spindle. As these are believed obvious, no further description is believed necessary.

As may be observed in FIGURES 4 and 6, the guide 32 preferably extends to a point sufficiently in proximity to the bottom of the dispenser so as to cause tape being removed from the roll to pass beneath it and to provide a generally straight line between the point at which the tape leaves the roll and the point at which it is sealed against a surface by the pressure foot roller 34.

As will be obvious the knurled roller 48 which serves to raise the tape prior to cutting to enable the serrated edges of the fingers to pass beneath it is mounted from the finger support arm in order to move cooperatively therewith. In the preferred construction, a roller is used although a projecting hook would similarly function.

In the preferred construction the pressure roller 34 is suspended on a pair of bifurcated shafts which project in parallel relation from the cross arm 112 mounted on the pivot 70 in perpendicular relation to the plunger arm 44. As may be seen in comparing FIGURES 5 and 6 in relation to FIGURE 2, as the arm 44 moves downwardly, the parallel shafts 40—40 similarly move downwardly within the body to move the roller 34 into engagement with tape being dispensed. The downward movement of the plunger arm 44 which is journaled with the upper end extremities of the segments 68 and 66 at the pivot 70 toward the fixed pivot 82 moves the fingers 102 and 104 outwardly, towards the sides of the dispenser and simultaneously raises the blades 94 and 96 upwardly. As the plunger is depressed still further, the roller 34 urges the end of the tape which is no longer held by the fingers 102 and 104 into engagement with the surface to be sealed. When the plunger is released as previously explained, the roller 34 raises while the fingers 102 and 104 move beneath the tape to urge it upwardly towards the blades 94 and 96 which simultaneously move downward and across inwardly toward each other to shear the tape.

As may be seen in FIGURES 4 and 6, aperture means such as a slot 114 is provided so that ribbon may be dispensed alternatively beneath the roller 52 to the bottom or above the roller 52 through the aperture 114. This alternative means of dispensing is provided inasmuch as it is sometimes advantageous to have ribbon which is to be used in tying in a position where it may be tightly held against the end 50 of the body 12.

The lever arm segments may be of any material of sufficient structural strength to withstand repeated scissoring action. The fixed pivot 82 as previously indicated is preferably integral with the guide 32, the segments 78 and 80 being held in pivotal relation to the fixed pivot 82 by any convenient means such as a keeper 116.

The relationship of the fingers and the blade when the dispenser is in a position to dispense tape is clearly shown in FIGURE 5. The relationship of the blades to the fingers when the dispenser is in shearing relation is clearly shown in FIGURE 2. As will be obvious, the tapering of the fingers and the downward angling of the fingers 102 enables the fingers to more readily pass underneath the adhesive surface of the tape and to raise it upwardly towards the shearing blades. The action of the fingers in relation to the tape is thereby to move toward each other beneath the tape and to raise it upwardly towards the blades to be sheared. Upon being sheared, the end of the tape is held above the bottom of the dispenser whereupon depression of the plunger toward the top of the dispenser causes the fingers to move outwardly from beneath the tape and away from each other towards the sides of the dispenser thereby permitting the roller 34 to urge the end of the tape downwardly into sealing relation with the surface to be sealed. Resilient means may be provided at the pivot 42 to urge the arms 38 holding the roller 34 downwardly to more quickly urge the end of the tape towards sealing relationship when the plunger arm 44 is depressed.

As is apparent in FIGURES 4 and 6, the scissoring arm segments are spaced forwardly of the parallel arms 40 on the pivots 70 and 82.

It will be further evident from the views of FIGURES 3, 4, 5, and 6 that the shearing blades 94 and 96 and the opposed triangular shaped upper edge serrated fingers 102 and 104 are pivotally interconnected by the pivots 88 and 90 so that tape being dispensed is raised towards the blades by the fingers and held tautly by the serrations of the fingers to enable the blades 94 and 96 to more readily cut the suspended tape, the cut end of the tape being held above the open bottom of the dispenser by the fingers. Accordingly, the tape from the roll is always in a position above the bottom of the dispenser 10 ready to be dispensed when the plunger arm 44 actuates the fingers 102 and 104 to move outwardly towards the sides 14 and 16 away from underlying relation to the cut end of the tape, and the pressure roller 34 to urge the cut end of the tape through the outlet opening in the bottom.

As may be seen in FIGURE 6, the second pair of opposed knurled rollers 47 are similar to the roller 48. The rollers 48 hold the end of the tape coming from the roll 30 after it is cut. This serves to prevent the tape being drawn back toward the roll after cutting. The rollers 49 enable the tape to be more readily drawn smoothly down into sealing position after shearing.

In accordance with the patent statutes, the principles of construction and operation of this improvement in "Tape Sealer" have been described, and while an endeavor has been made to set forth the best embodiment thereof, it should be understood that changes may be made within the scope of the following claims without departing from the spirit of the invention.

I claim:

1. An elongated tape dispenser for use in combination with a roll of tape comprising:
   (a) an elongated hollow body having generally upstanding spaced apart sides and a top secured to marginal edges of said sides,
   (b) said body having a forward end portion and a rearward end portion,
   (c) a spindle extending generally perpendicular to said sides in said rearward end portion of said body rotatably carrying a roll of tape,
   (d) said forward end portion of said body including an outlet through which tape carried on said spindle is adapted to be dispensed,
   (e) lift means carrying the free end of tape from said roll within said body in spaced above relation to a surface to be covered by tape,
   (f) pressure foot means to urge the free end of said tape into contacting relation to a said surface to be taped,
   (g) shear means in said body including blade pivotally mounted in spaced above shearing relation to tape being dispensed whereby tape being dispensed is adapted to be sheared at any desired point by pivotal motion of said blade, and
   (h) actuating means including a plunger whereby said pressure foot means is moved in coordinated relation to said lift means and said shear means.

2. The structure of claim 1 and in which said lift means includes finger means in generally perpendicular relation to the side edges of tape being dispensed, said finger means pivotally connected to said actuating means and movable into and out of underlying relation to said tape.

3. The structure of claim 1 and in which said shear means includes a pair of blades in side by side scissoring relation connected to said actuating means, whereby movement of said actuating means produces scissoring movement of said blades.

4. The structure of claim 3 and in which said lift means includes finger means in generally perpendicular relation to the side edges of tape being dispensed, said finger means pivotally connected to said actuating means and moveable into and out of underlying relation to said tape, movement of said finger means beneath said tape lifting said tape toward said blades whereby said tape may be sheared.

5. The structure of claim 1 and in which said top includes an aperture intermediate said forward side portions, said plunger including a shaft slidable upwardly and downwardly in said aperture having a head end and a bottom end, said bottom end including a pivot, lever arms extending from said pivot in the form of an inverted V, arm segments in crossed relation pivotally extending from the ends of said lever arms, a fixed pivot holding said segments in crossed relation, spring means secured intermediate the ends of said lever arms to urge them together, extension means connected to the ends of said crossed arm segments extending toward said dispenser bottom to which said finger means are secured, members extending from the ends of said crossed arm segments having said blade means secured to their ends, said members being pivotally secured in crossed relation, whereby movement of said plunger induces scissoring movement of said blades, and movement of said finger means beneath said tape urges said tape upwardly.

6. The structure of claim 1 and in which said pressure foot means includes foot means connected to said actuating means in spaced above relation to said tape, whereby movement of said plunger toward the bottom of said dispenser urges said foot means against said tape and through said outlet.

7. The structure of claim 1 and in which said outlet includes an opening in said bottom.

8. An elongated tape dispenser for use in combination with a roll of tape comprising:
   (a) an elongated hollow body having generally upstanding spaced apart sides and a top marginally secured to said sides,
   (b) said body having a forward end portion and a rearward end portion,
   (c) said body having a bottom including an outlet opening through which tape is adapted to be dispensed,
   (d) a spindle extending intermediate said sides and in generally perpendicular relation thereto rotatably carrying a roll of tape,
   (e) guide means in said body whereby tape led from said roll is guided toward the bottom of said dispenser,
   (f) a plunger in said body movable toward and away from said bottom spaced intermediate said guide means and the end of said forward end portion,
   (g) pressure foot means including a roller in superimposed relation to tape being dispensed and said outlet connected to said plunger whereby movement of said plunger toward said bottom urges said tape through said outlet,
   (h) a fixed pivot in said body extending axially of said body in generally parallel relation to said bottom,
   (i) lever arms secured in crossed relation to said pivot,
   (j) bifurcated arm means connecting the ends of said crossed lever arms to said plunger to move said lever arms in scissored relation,
   (k) resilient means including a spring secured to lever arms adjacent said bifurcated arm means to urge said lever arms toward each other,
   (l) a pair of generally parallel shafts extending from the ends of said lever arms to a point adjacent the bottom of said body,
   (m) a pair of opposed triangular fingers extending inwardly from the extremities of said shafts adapted to be moved into and out of underlying relation to said tape being dispensed,
   (n) a pair of crossed arm segments having ends pivotally secured to the ends of said lever arms,
   (o) the other ends of said arm segments having blade members in scissoring side by side relation,
   (p) said tape being dispensed extending between said blade members and said underlying fingers,
   (q) whereby when said fingers move under said tape said tape is raised into shearing relation to said blades.

9. The structure of claim 8 and in which said body includes roller means in coplanar axially parallel relation to said pressure foot when said pressure foot is in pressuring relation to said tape whereby said bottom of said body is movable in parallel relation to said surface on which said tape is dispensed.

10. The structure of claim 9 and in which said roller means includes a forward roller adjacent said forward end, said forward end having a transverse slot adjacent said forward roller, whereby said tape being dispensed is adapted to be dispensed above said forward roller through said slot or beneath said forward roller through said outlet opening.

11. The structure of claim 8 and in which the edge of said triangular fingers furthest from said bottom is serrated.

12. An elongated tape dispenser for use in combination with a roll of tape comprising:
   (a) a hollow body having spaced apart generally upstanding sides including a forward portion and a rear portion,
   (b) a spindle adapted to rotatively carry a roll of tape intermediately perpendicular to said sides in said rear portion,
   (c) said body having an open bottom through which tape carried on said spindle may be dispensed forwardly of said spindle,
   (d) opposed finger means carried in said body above said open bottom movable toward and away from said sides into and out of underlying relation to tape being dispensed,
   (e) a pressure roller extending transversely between said sides carried on a shaft in superimposed relation to said tape extending from said spindle toward said forward end of said body,
   (f) said shaft movable toward and away from said open bottom,
   (g) arm means pivotally secured to said shaft relating movement of said finger means to movement of said pressure roller whereby said fingers move out from underlying relation to said tape when said pressure roller urges tape through said open bottom,
   (h) shear means in pivotally connected superimposed relation to said tape and said fingers whereby when said fingers move into underlying relation to said tape said shear means is pivoted into shearing relation with said tape.

No references cited.

EARL M. BERGERT, *Primary Examiner.*

D. J. DRUMMOND, *Assistant Examiner.*